US012682913B1

(12) United States Patent
Achanta et al.

(10) Patent No.: US 12,682,913 B1
(45) Date of Patent: Jul. 14, 2026

(54) MULTI-RATE END-TO-END NEURAL AUDIO UPSAMPLER

(71) Applicant: Apple Inc., Cupertino, CA (US)

(72) Inventors: Sivanand Achanta, Sunnyvale, CA (US); Peter Kroon, Green Brook, NJ (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 18/670,867

(22) Filed: May 22, 2024

(51) Int. Cl.
*G10L 21/04* (2013.01)
*G10L 21/0324* (2013.01)
*G10L 25/30* (2013.01)

(52) U.S. Cl.
CPC .......... *G10L 21/04* (2013.01); *G10L 21/0324* (2013.01); *G10L 25/30* (2013.01)

(58) Field of Classification Search
None
See application file for complete search history.

(56) References Cited

U.S. PATENT DOCUMENTS 9,294,060 B2 3/2016 Myllyla et al.
11,238,877 B2 * 2/2022 Chang .................. G10L 21/038
11,508,394 B2 * 11/2022 Jose .................... G06N 3/0455
12,046,249 B2 * 7/2024 Assael .................... G06N 3/08
12,217,742 B2 * 2/2025 Jin ......................... G10L 15/16
2021/0241776 A1 8/2021 Sivaraman et al.
2023/0016637 A1 1/2023 Schmidt et al.
2023/0076431 A1 * 3/2023 Nyayate ................ G06N 3/063
2023/0162725 A1 * 5/2023 Jin ......................... G06N 3/088 704/232
2023/0326476 A1 * 10/2023 Andreev ............. G06N 3/0475
2024/0363131 A1 * 10/2024 Dai ........................ G10L 25/27

FOREIGN PATENT DOCUMENTS

CN 115035908 A 9/2022
CN 115376543 B 11/2022
CN 116110424 A 5/2023
CN 117476024 A 1/2024
KR 102078350 B1 2/2020

OTHER PUBLICATIONS

Kuleshov, Volodymyr, S. Zayd Enam, and Stefano Ermon. "Audio super-resolution using neural nets." ICLR (Workshop Track). 2017. (Year: 2017).*

(Continued)

*Primary Examiner* — Douglas Godbold
(74) *Attorney, Agent, or Firm* — Sterne, Kessler, Goldstein & Fox P.L.L.C.

(57) ABSTRACT

The present disclosure describes aspects of an end-to-end neural audio upsampler and bandwidth extender. In some aspects, the end-to-end neural audio upsampler and bandwidth extender is configured to receive an input signal having a first bandwidth and generate, using a first neural network model and in a time domain, a feature vector based on the input signal. The end-to-end neural audio upsampler and bandwidth extender is further configured to generate, using a second neural network model and in the time domain, an output signal based on the feature vector, where the output signal has a second bandwidth that is greater than the first bandwidth.

20 Claims, 7 Drawing Sheets

(56) References Cited

OTHER PUBLICATIONS

Liu, Haohe, et al. "AudioSR: Versatile audio super-resolution at scale." ICASSP 2024-2024 IEEE International Conference on Acoustics, Speech and Signal Processing (ICASSP). IEEE, 2024. (Year: 2024).*

Su, Jiaqi, et al. "Bandwidth extension is all you need." ICASSP 2021-2021 IEEE International Conference on Acoustics, Speech and Signal Processing (ICASSP). IEEE, 2021. (Year: 2021).*

Li et al., "Real-Time Speech Frequency Bandwidth Extension," Feb. 9, 2021; 5 pages.

Mandel et al., "Aero: Audio Super Resolution in the Spectral Domain," Jun. 4, 2023; 5 pages.

* cited by examiner

MULTI-RATE END-TO-END NEURAL AUDIO UPSAMPLER

FIELD

This disclosure relates to an audio upsampler and, more particularly, to an audio sampler that uses a neural network trained to upsample narrowband (NB) signals and/or wideband (WB) signals to super wideband (SWB) signals.

BACKGROUND

Audio signals are transmitted and received by user devices. These audio signals can be part of phone calls, video call, audio conferences, video conferences and the like. The audio signals can go through operator-controlled cellular services (e.g., circuit switched (2G/3G) or packet switched (4G/5G)) or use audio/video over IP (VoIP) services, as some non-limiting examples. Based on constraints on data rates and technology, audio signals were transmitted, for example, as narrowband (NB) signals (where the audio frequency bandwidth is limited to be less than 4000 Hz) sampled at 8 kHz. Later versions of the audio/video services supported transmission of audio signals as wideband (WB) signals with a bandwidth of up to 8000 Hz, sampled at 16 kHz. Later services support super wideband (SWB) signals with a bandwidth of at least 12000 Hz and sampled at 24 kHz or higher. This evolution in service capabilities has led to a mixture of different bandwidths that the end-user can experience. For example, an older model user device (e.g., a phone) may only be able to transmit in NB and, despite having a newer model user device (e.g., a phone) on the receiving end, the quality can be muffled, thus disturbing to the end user. It is even possible that, due to limitations of a network, an audio signal can change from SWB to NB in an audio call, which makes degradation in the audio signal noticeable to the end user.

SUMMARY

Various aspects of this disclosure relate to system, apparatus, article of manufacture, method and/or computer program product aspects, and/or combinations and sub-combinations thereof, for end-to-end neural audio upsampling and bandwidth extension (BWX).

Various aspects of an end-to-end neural audio upsampler and bandwidth extender are disclosed. In some aspects, the end-to-end neural audio upsampler and bandwidth extender is configured to receive an input signal having a first bandwidth and generate, using a first neural network model and in a time domain, a feature vector based on the input signal. The end-to-end neural audio upsampler and bandwidth extender is further configured to generate, using a second neural network model and in the time domain, an output signal based on the feature vector, where the output signal has a second bandwidth that is greater than the first bandwidth.

In some aspects, a method includes receiving, by an encoder, an input signal having a first bandwidth and generating, using a first neural network model of the encoder and in a time domain, a feature vector based on the input signal. The method further includes generating, using a second neural network model of a decoder and in the time domain, an output signal based on the feature vector, where the output signal has a second bandwidth that is greater than the first bandwidth.

In some aspects, a non-transitory computer-readable medium stores instructions that, when executed by a processor of an electronic device, cause the electronic device to perform operations including receiving, by an encoder, an input signal having a first bandwidth. The operations further include generating, using a first neural network model of the encoder and in a time domain, a feature vector based on the input signal. The first neural network model includes encoder blocks with respective downsampling factors. The operations further include generating, using a second neural network model of a decoder and in the time domain, an output signal based on the feature vector. The output signal has a second bandwidth that is greater than the first bandwidth. The second neural network model includes decoder blocks with respective upsampling factors.

BRIEF DESCRIPTION OF THE DRAWINGS

Aspects of the present disclosure are best understood from the following detailed description when read with the accompanying figures.

Illustrative aspects will now be described with reference to the accompanying drawings. In the drawings, like reference numerals generally indicate identical, functionally similar, and/or structurally similar elements.

DETAILED DESCRIPTION

Figure 1:
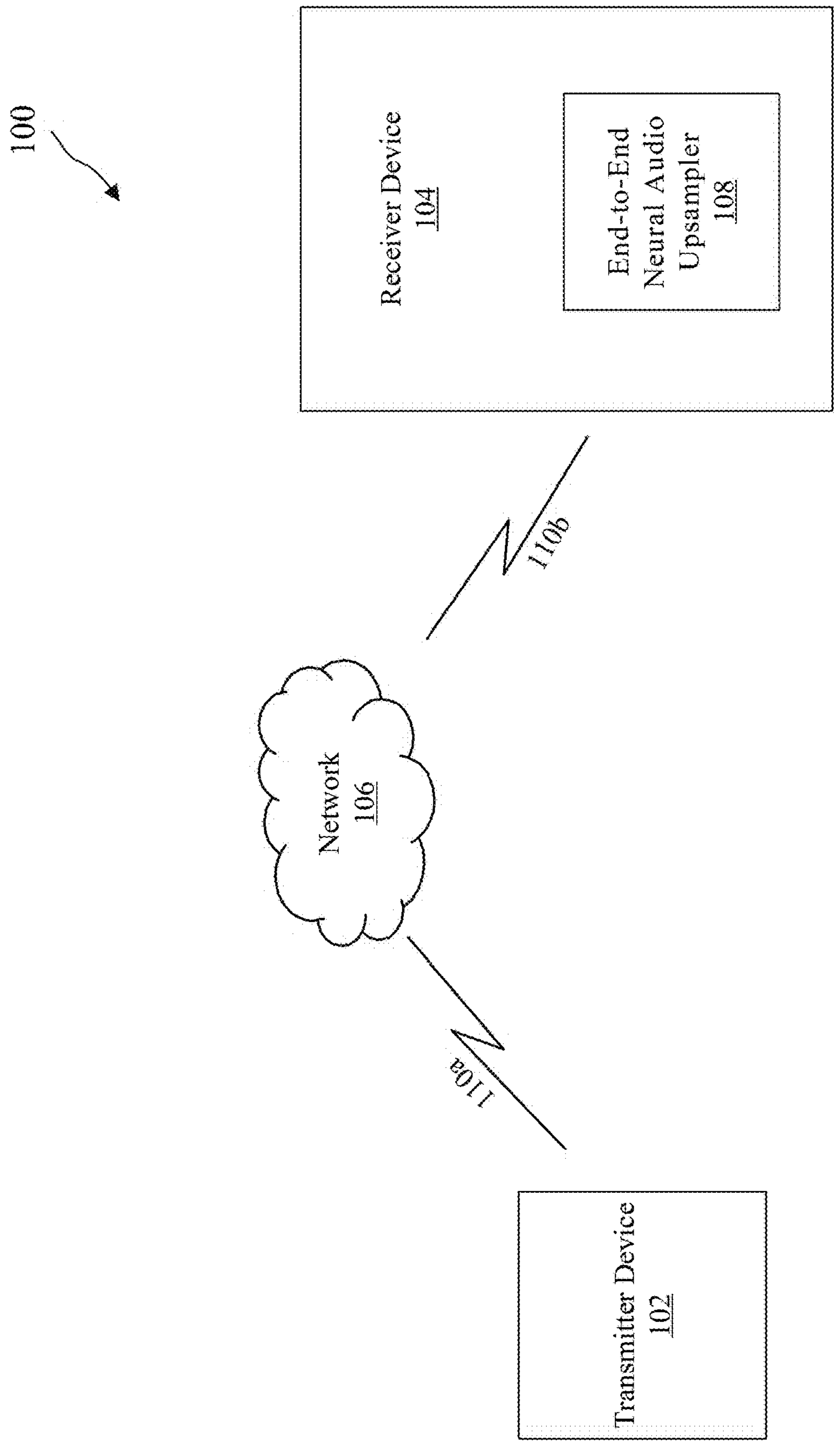
FIG. 1 illustrates a system that includes an end-to-end neural audio upsampler, according to some aspects.

The following disclosure provides many different aspects, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various aspects and/or configurations discussed.

It is noted that references in the specification to "one aspect," "an aspect," "an example aspect," "exemplary," etc., indicate that the aspect described may include a particular feature, structure, or characteristic, but every aspect may not necessarily include the particular feature, structure, or characteristic. Moreover, such phrases do not necessarily refer to the same aspect. Further, when a particular feature, structure or characteristic is described in connection with an aspect, it would be within the knowledge of one skilled in the art to effect such feature, structure or characteristic in connection with other aspects whether or not explicitly described.

In some aspects, the terms "about" and "substantially" can indicate a value of a given quantity that varies within 20% of the value (e.g., ±1%, ±2%, ±3%, ±4%, ±5%, ±10%, ±20% of the value). These values are merely examples and are not intended to be limiting. The terms "about" and "substantially" can refer to a percentage of the values as interpreted by those skilled in relevant art(s) in light of the teachings herein.

It is to be understood that the phraseology or terminology herein is for the purpose of description and not of limitation, such that the terminology or phraseology of the present specification is to be interpreted by those skilled in relevant art(s) in light of the teachings herein.

FIG. 1 illustrates a system 100 that includes an end-to-end neural audio upsampler 108, according to some aspects. Example system 100 is provided for the purpose of illustration only and does not limit the disclosed aspects. As shown in FIG. 1, system 100 can include a transmitter device 102 and a receiver device 104. Transmitter device 102 (e.g., a user equipment (UE)) can communicate with receiver device 104 (e.g., a UE) using network 106. Although transmitter device 102 is discussed herein as a transmitter device, aspects of this disclosure can include a transceiver device as transmitter device 102. Similarly, although receiver device 104 is discussed herein as a receiver device, aspects of this disclosure can include a transceiver device as receiver device 102.

Transmitter device 102 and receiver device 104 can include, but are not limited to, electronic devices, such as wireless communication devices, smart phones, laptops, desktops, tablets, personal assistants, monitors, televisions, wearable devices, gaming devices, Internet of Thing (IoT) devices, and the like. Network 106 can include any communication network. For example, network 106 can be a wireless network, a wired network, or a combination thereof. Network 106 can be one of, or a combination of, a wireless local area network (WLAN), a VoIP network, the Internet, a cellular network (e.g., 2G/3G/4G/5G networks, such as Universal Mobile Telecommunications System (UMTS), Long-Term Evolution (LTE), and the like), and the like.

Transmitter device 102 and receiver device 104 communications are shown as wireless communications 110. The communication between transmitter device 102 and receiver device 104 can take place using wireless communications 110*a* and 110*b*. The wireless communications 110*a* and 110*b* can be based on a wide variety of wireless communication techniques. These techniques can be based on, for example, IEEE 802.11, one or more of Release 15 (Rel-15), Rel-16, Rel-17, Rel-18, NR, or other of the 3rd Generation Partnership Project (3GPP) standards, or any other communication standards. Communication network 106 and communications 110 are not limited to these examples and can include other networks and standards.

According to some aspects, transmitter device 102 transmits audio signals and receiver device 104 receives the transmitted audio signals. The audio signals received by the receiver device 104 can be narrowband (NB) signals (where the audio frequency bandwidth is limited to be less than 4000 Hz) sampled at 8 kHz, wideband (WB) signals with a bandwidth of up to 8000 Hz, sampled at 16 kHz, and/or super wideband (SWB) signals with a bandwidth of at least 12000 Hz and sampled at 24 kHz or higher, according to some aspects. As discussed in more detail below, the receiver device 104 can be configured to convert the received audio signal to an SWB signal to increase the user experience of the user of receiver device 104.

For example, receiver device 104 can include end-to-end neural audio upsampler 108 (also referred to herein as a bandwidth extender) configured to convert the received audio signal to an SWB signal to make the user experience of the user of receiver device 104 consistent regardless of the bandwidth used to transmit the audio signal. According to some aspects, end-to-end neural audio upsampler 108 can include a neural network trained to upsample NB and WB signals to an SWB signal (e.g., an audio signal with SWB bandwidth). Therefore, the user of receiver device 104 can experience high-quality SWB signals irrespective of the received audio signal.

According to some aspects, in addition to, or alternatively to, changing the sampling frequency, end-to-end neural audio upsampler 108 can also generate missing higher frequencies of the input audio signal (e.g., super-resolution audio or audio bandwidth extension). In contrast, a sample rate converter can only change the sampling frequency but will not create the missing high frequencies. In a non-limiting example, for a NB audio signal (e.g., with sampling frequency of 8 kHz) the sample rate converter can upsample the NB signal but the sample rate converter does not increase the BW of the NB signal. In contrast, end-to-end neural audio upsampler 108 is configured to increase the BW of the NB signal by adding samples in the frequencies above the BW of the NB signal to increase/extend the BW of the NB signal to generate, for example, an SWB signal. According to some aspects, end-to-end neural audio upsampler 108 is configured to extend BW because there are a lot of correlations in the audio signal. According to some aspects, end-to-end neural audio upsampler 108 can use the correlation between the lower and higher frequencies in the NB signal to estimate/predict values for the SWB signal at the higher frequencies. End-to-end neural audio upsampler 108 can use the correlation information and generate an optimal quality SWB signal even with background (e.g., noise) signals that are added to the NB audio signal.

According to some aspects, end-to-end neural audio upsampler 108 can use machine learning models to generate the high frequency signal values that increase the quality of the signal and can consider other non-voice signals (e.g., music, noise, or the like) in generating the high frequency signal values. Additionally, end-to-end neural audio upsampler 108 using machine learning aspects of this disclosure can be efficiently implemented on receiver device 104 given the processing power of the receiver device 104.

According to some aspects, the receiver device 104 is configured to receive and process multiple different sampling rates. A single end-to-end neural audio upsampler 108 is configured to process multiple different sampling rates at its input. For example, end-to-end neural audio upsampler 108 is configured to receive audio signals as input at NB and WB bandwidths using multiple encoders and then take the resulting output of the encoders and upsample it to SWB bandwidth in a single decoder. Using this architecture, end-to-end neural audio upsampler 108 can take in signals sampled at multiple input rates and resample them to SWB bandwidth. Moreover, by sharing the same decoder network, a substantial reduction in memory footprint can be achieved.

According to some aspects, end-to-end neural audio upsampler 108 is configured to stream the output. In other words, end-to-end neural audio upsampler 108 does not wait for receiver device 104 to receive all the data (e.g., the audio signal) from transmitter device 102, but rather receives the data as and when transmitter device 102 sends the data. This is important for natural audio communication. To achieve this, the encoders and the decoder of end-to-end neural audio upsampler 108 are designed to be fully causal, allowing streaming during run-time without introducing substantial delays. For example, end-to-end neural audio upsampler 108 can operate on a given period (e.g., 20 ms) of a received signal so that end-to-end neural audio upsampler 108 does not introduce any additional delays.

According to some aspects, end-to-end neural audio upsampler 108 achieves high-quality upsampled signals. For example, end-to-end neural audio upsampler 108 uses two techniques to achieve the high-quality upsampled signal. For example, the model of end-to-end neural audio upsampler 108 is designed and/or trained using multiple loss functions including, for example, adversarial loss functions to generate near SWB like signals even when the input is an NB signal or a WB signal. Additionally, the use of large-scale high-quality data for training the model of end-to-end neural audio upsampler 108 helps in achieving the high-quality upsampled signal.

According to some aspects, end-to-end neural audio upsampler 108 is robust to many different speakers, languages, and environmental conditions, and the like. For example, end-to-end neural audio upsampler 108 is trained on massive amounts of audio data which contains many different speakers, background noise conditions, etc. This makes end-to-end neural audio upsampler 108 robust and also improves the quality of upsampling.

According to some aspects, and in contrast to upsampling models that use one model for every sampling rate (e.g., different models for different sampling rates), end-to-end neural audio upsampler 108 uses only one model for all sampling rates. Additionally, or alternatively, end-to-end neural audio upsampler 108 does not rely on special features of the audio signal or the audio and is trained end-to-end directly in the time domain (e.g., audio waveform). By operating in the time domain, end-to-end neural audio upsampler 108 has a more simplified architecture and is configured to consider phase information of the audio signal in its upsampling operation. Modeling directly in the waveform allows end-to-end neural audio upsampler 108 to model nuances present in the audio signal without ignoring any component.

According to some aspects, end-to-end neural audio upsampler 108 can use multiple neural encoders with input signals at the sampling rates used by audio coders (e.g., 8 and 16 kHz). Additionally, or alternatively, end-to-end neural audio upsampler 108 can use a single neural encoder, which takes as input the upsampled versions of these 8 and 16 kHz signals using sample rate conversion (e.g., upsampled to 24 kHz) together with a condition signal identifying the original sampling frequency and with the neural decoder outputting an audio signal at the 24 kHz sampling rate, while recreating the missing high frequency signals.

According to some aspects, end-to-end neural audio upsampler 108 can embody the same topology used for the audio neural-end to coding technique allowing the output of the encoder to be quantized for efficient low rate transmission. As a result, the data compression and the bandwidth extension can be done of the same time, without compromising quality of the compression and bandwidth extension functionalities. According to some aspects, end-to-end neural audio upsampler 108 is a dedicated circuitry configured to perform the bandwidth extension operations discussed herein. For example, end-to-end neural audio upsampler 108 can be a dedicated circuitry configured to convert the received audio signal to an SWB signal to make the user experience of the user of receiver device 104 consistent regardless of the bandwidth used to transmit the audio signal. For example, end-to-end neural audio upsampler 108 can be a dedicated circuitry configured to change the sampling frequency and/or generate missing higher frequencies of the input audio signal (e.g., super-resolution audio or audio bandwidth extension).

Additionally, or alternatively, end-to-end neural audio upsampler 108 can include or can be a processing circuitry dedicated to neural network processing configured to perform the bandwidth extension operations discussed herein. For example, end-to-end neural audio upsampler 108 can be a processing circuitry dedicated to neural network processing configured to convert the received audio signal to an SWB signal to make the user experience of the user of receiver device 104 consistent regardless of the bandwidth used to transmit the audio signal. For example, end-to-end neural audio upsampler 108 can be a processing circuitry dedicated to neural network processing configured to change the sampling frequency and/or generate missing higher frequencies of the input audio signal (e.g., super-resolution audio or audio bandwidth extension).

It is noted that this disclosure is not limited to specific input and output sampling frequencies, and end-to-end neural audio upsampler 108 can be retrained to support other suitable sampling rate conversions.

According to some aspects, end-to-end neural audio upsampler 108 is backward compatible with existing voice coders and uses limited computational and memory resources.

Figure 2:
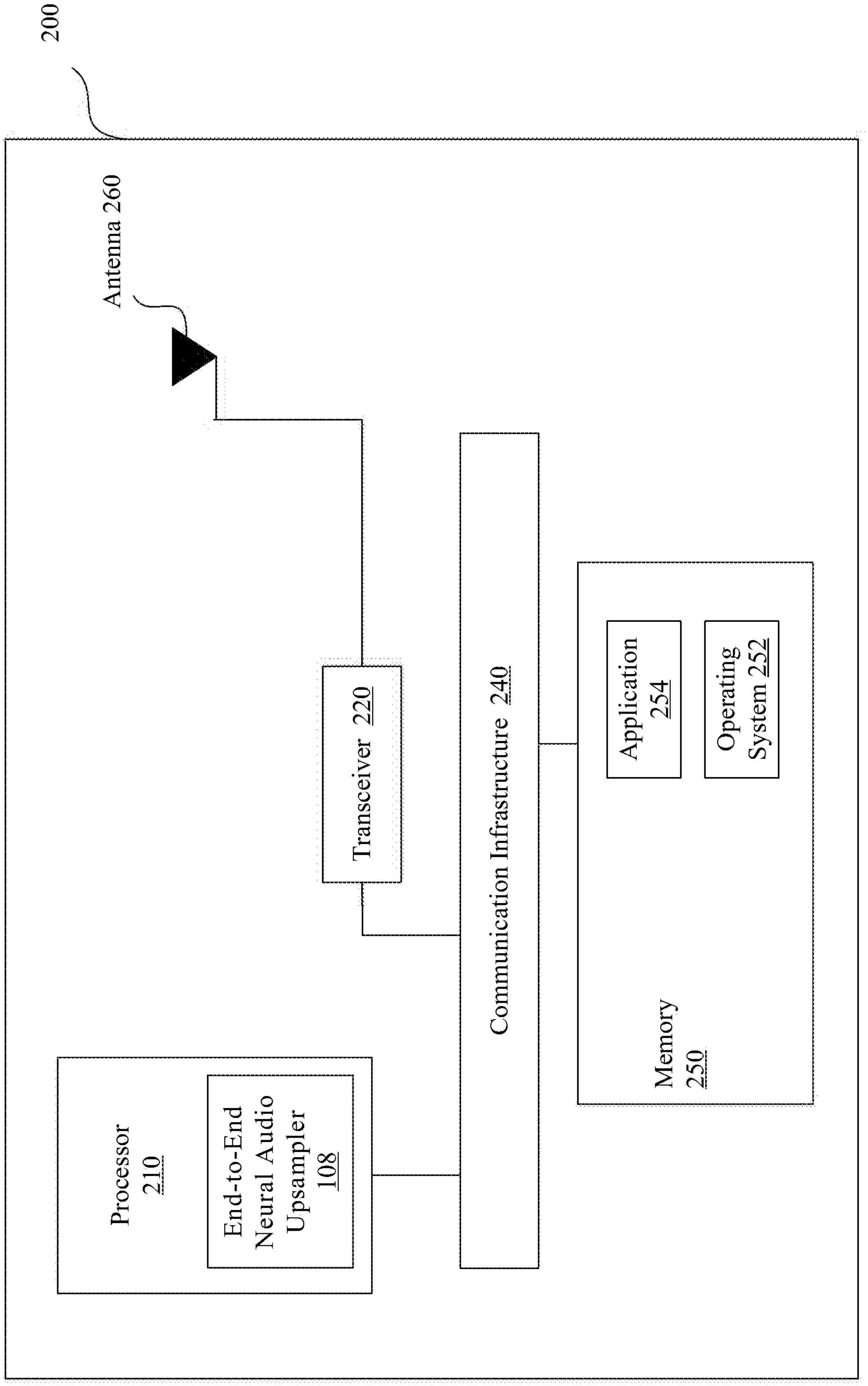
FIG. 2 illustrates a block diagram of an example system of an electronic device implementing mechanisms for end-to-end neural audio upsampling and bandwidth extension, according to some aspects.

FIG. 2 illustrates a block diagram of an example system 200 of an electronic device implementing mechanisms for end-to-end neural audio upsampling and bandwidth extension, according to some aspects. System 200 may be any of the electronic devices (e.g., transmitter device 102 and receiver device 104) of system 100. The system 200 (e.g., a wireless system) includes at least a processor 210, one or more transceivers 220, a communication infrastructure 240, a memory 250, an operating system 252, an application 254, and one or more antennas 260. Illustrated systems are provided as exemplary parts of the system 200, and the system 200 can include other circuit(s) and subsystem(s). Also, although the devices of the system 200 are illustrated as separate components, the aspects of this disclosure can include any combination of these, fewer, more, and/or different components.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 can be stored in the memory 250. The operating system 252 can manage transfer of data from the memory 250 and/or one or more applications 254 to the processor 210 and/or one or more transceivers 220. In some examples, the operating system 252 maintains one or more network protocol stacks (e.g., Internet protocol stack, cellular protocol stack, and the like) that can include a number of logical layers. At corresponding layers of the protocol stack, the operating system 252 includes control mechanism and data structures to perform the functions associated with that layer.

According to some examples, the application 254 can be stored in the memory 250. The application 254 can include applications (e.g., user applications) used by the system 200 and/or a user of the system 200. The applications in application 254 can include applications such as, but not limited to, audio streaming, video streaming, remote control, and/or other user applications.

The system 200 can also include the communication infrastructure 240. The communication infrastructure 240 provides communication between, for example, the processor 210, one or more transceivers 220, and the memory 250. In some implementations, the communication infrastructure 240 may be a bus. The processor 210 together with instructions stored in the memory 250 performs operations enabling the system 200 of system 100 to implement mechanisms for end-to-end neural audio upsampling and bandwidth extension, as described herein. Additionally, or alternatively, the one or more transceivers 220 perform operations enabling the system 200 of system 100 to implement mechanisms for end-to-end neural audio upsampling and bandwidth extension.

The one or more transceivers 220 transmit and receive communications signals that support mechanisms for end-to-end neural audio upsampling and bandwidth extension, according to some aspects, and may be coupled to the antenna 260. The antenna 260 may include one or more antennas that may be the same or different types. The one or more transceivers 220 allow the system 200 to communicate with other devices that may be wired and/or wireless. In some examples, the one or more transceivers 220 can include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects, the one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, the one or more transceivers 220 can include more or fewer systems for communicating with other devices.

In some examples, the one or more transceivers 220 can include one or more circuits (including a WLAN transceiver) to enable connection(s) and communication over WLAN networks such as, but not limited to, networks based on standards described in IEEE 802.11. Additionally, or alternatively, the one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol.

Additionally, the one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), and the like. For example, the one or more transceivers 220 can be configured to operate according to one or more of Rel-15, Rel-16, Rel-17, Rel-18, NR, or other of the 3GPP standards.

According to some aspects, the processor 210, alone or in combination with computer instructions stored within the memory 250, the one or more transceivers 220, and/or antennas 260 implements mechanisms for end-to-end neural audio upsampling and bandwidth extension, as discussed herein. For example, processor 210 can include end-to-end neural audio upsampler 108 for end-to-end neural audio upsampling and bandwidth extension.

FIGS. 3A-3D illustrate exemplary configurations of an end-to-end neural audio upsampler (also referred to herein as bandwidth extender), according to some aspects. Example end-to-end neural audio upsamplers (also referred to herein as bandwidth extenders) 300, 320, and 340 are provided for the purpose of illustration only and does not limit the disclosed aspects.

Figures 3A, 3B, 3C:
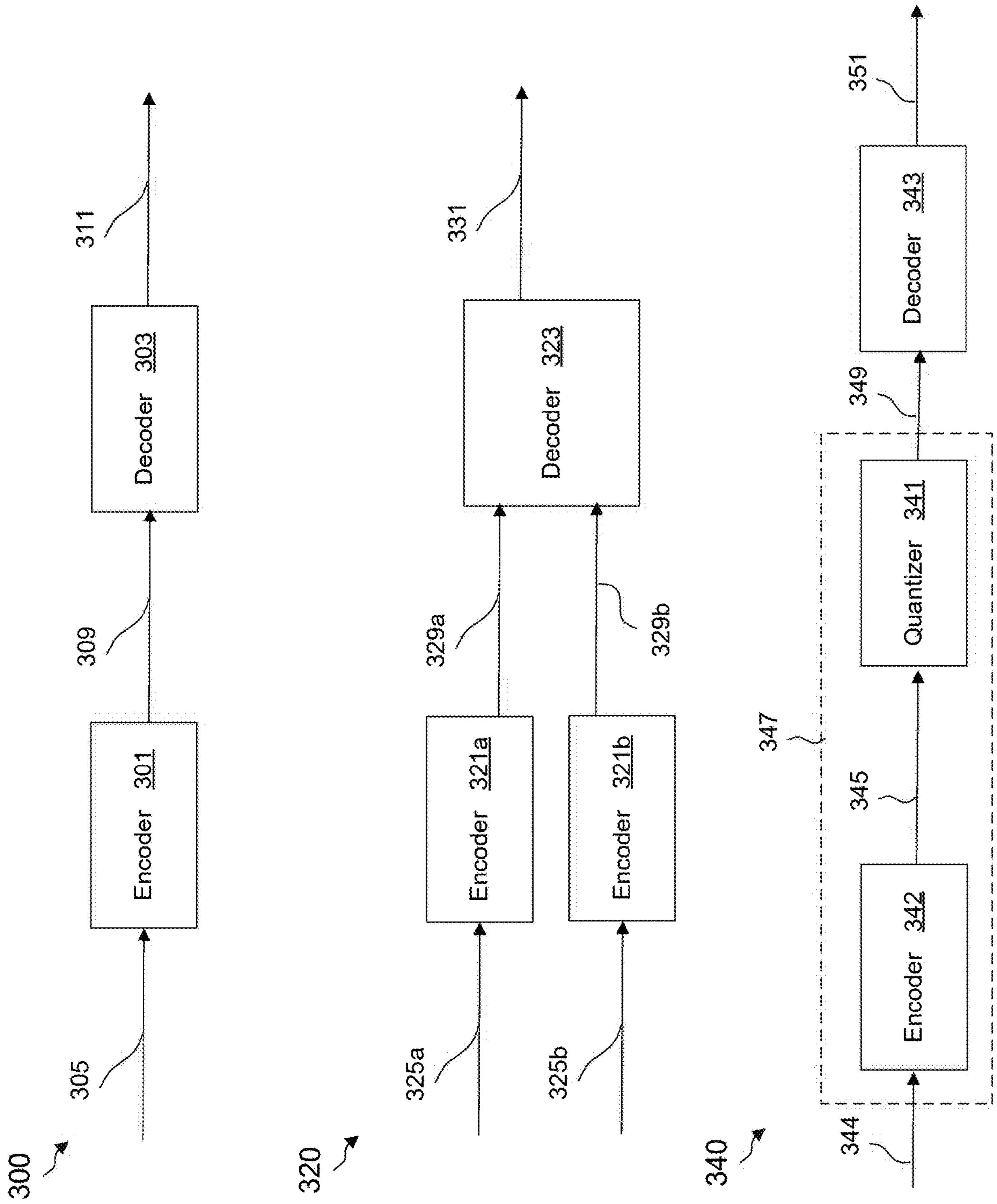
FIGS. 3A-3E illustrate exemplary configurations of an end-to-end neural audio upsampler (also referred to herein as bandwidth extender), according to some aspects.

FIG. 3A illustrates one exemplary end-to-end neural audio upsampler 300. End-to-end neural audio upsampler 300 includes an encoder 301 and a decoder 303. As discussed above, end-to-end neural audio upsampler 300 can be part of a receiver device, such as receiver device 104 of FIG. 1. According to some aspects, encoder 301 receives an input signal 305. Input signal 305 can be an audio signal transmitted from a transmitter device, such as transmitter device 102 of FIG. 1. In some examples, input signal 305 can be an analog signal. In some examples, input signal 305 can be a digital signal. In some examples, input signal 305 is an NB signal. In some examples, input signal 305 is a VWB signal. In some examples, input signal 305 is an SWB signal.

According to some aspects, encoder 301 receives input signal 305 and samples input signal 305 at a first sampling rate (e.g., a first resolution). Encoder 301 samples input signal 305 to generate a sampled signal. In some examples, the first sampling rate is the same as the sampling rate of input signal 305. In some examples, the first sampling rate is different from the sampling rate of input signal 305. In some examples, the first sampling rate is based on the bandwidth of input signal 305. Encoder 301 is further configured to encode the sampled signal into a feature vector 309. According to some aspects, feature vector 309 is a feature representation of the sampled signal. According to some aspects, feature vector 309 can include a number of signal dimensional vectors/elements. In a non-limiting example, feature vector 309 can include 128 signal dimensional vectors/elements. But aspects of this disclosure are not limited to this example.

According to some aspects, encoder 301 can use neural network models, machine learning (ML) models, and/or artificial intelligent (AI) models to generate feature vector 309 from the sample signal. For example, encoder 301 can use a recurrent neural network, convolutional neural network, transformer neural network, or the like to generate feature vector 309 from the sample signal. In some aspects, encoder 301 can use a convolutional neural network to generate feature vector 309 from the sample signal to allow streaming. In other words, encoder 301 does not need to wait for the entirety of the input signal (that includes input signal 305) to be received in order to process input signal 305. For example, the convolutional neural network can use 20 ms of the input signal (that includes input signal 305) to process and deliver feature vector 309. The convolutional neural network architecture can make the bandwidth extension implementable in real time with little latency.

Decoder 303 is configured to receive feature vector 309 and upsample and bandwidth extend feature vector 309 to generate output signal 311. According to some aspects, decoder 303 upsamples and bandwidth extends feature vector 309 at a desired sampling rate (e.g., a desired resolution—e.g., 24 kHz). For example, decoder 303 receives feature vector 309 and adds the frequencies that are missing from the desired resolution to generate output signal 311 at the desired sampling rate (e.g., a desired resolution—e.g., 24 kHz).

According to some aspects, decoder 303 can use neural network models, machine learning (ML) models, and/or artificial intelligent (AI) models to generate output signal 311 from feature vector 309 from the sample signal. For example, decoder 303 can use a recurrent neural network, convolutional neural network, transformer neural network, or the like to generate output signal 311 from feature vector 309. In some aspects, decoder 303 can use a convolutional neural network to generate output signal 311 from feature vector 309 to allow streaming. In other words, end-to-end neural audio upsampler 300 does not need to wait for the entirety of the input signal (that includes input signal 305) to be received in order to process input signal 305. The convolutional neural network architecture can make the bandwidth extension implementable in real time with little latency.

According to some aspects, input signal 305 is an NB signal and output signal 311 is a WB signal and end-to-end neural audio upsampler 300 is configured to bandwidth extend the NB signal to the WB signal. According to some aspects, input signal 305 is an NB signal and output signal 311 is an SWB signal and end-to-end neural audio upsampler 300 is configured to bandwidth extend the NB signal to the SWB signal. According to some aspects, input signal 305 is a WB signal and output signal 311 is an SWB signal and end-to-end neural audio upsampler 300 is configured to bandwidth extend the WB signal to the SWB signal.

According to some aspects, encoder 301 has 4 encoder blocks, with each block containing 6 convolutional neural network layers with increasing dilation followed by a strided convolutional neural network layers for downsampling. For example, encoder neural network of encoder 301 can include a cascade of several smaller neural networks referred to as encoder blocks. In an exemplary implementation, four encoder blocks with different downsampling factors can be used. For example, for a NB input sampled at 8 kHz, encoder 301 can include four encoder blocks with downsampling factors 2, 4, 4, and 5, respectively. According to some aspects, decoder 303 mirrors encoder 301's structure with strided convolutional neural network layers, replaced by transposed convolutions for upsampling. For example, decoder neural network of decoder 303 can include a cascade of smaller decoder neural networks called decoder blocks. Each decoder block is followed by an upsampling operation. For example, decoder 303 can be configured to first upsample by a factor 10, followed by 6, 4, and 2 to output a SWB signal sampled at 24 kHz.

Figure 3D:
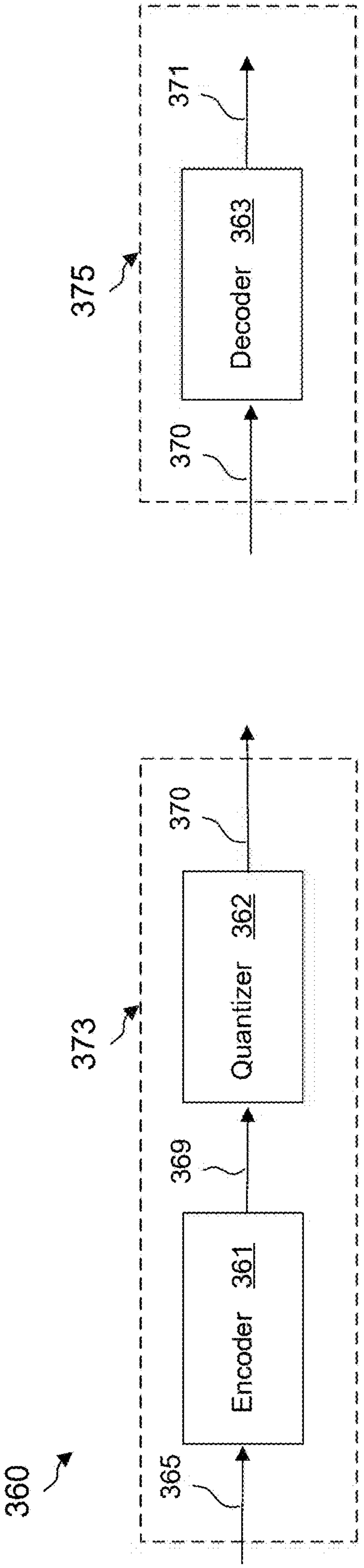
Figure 3E:
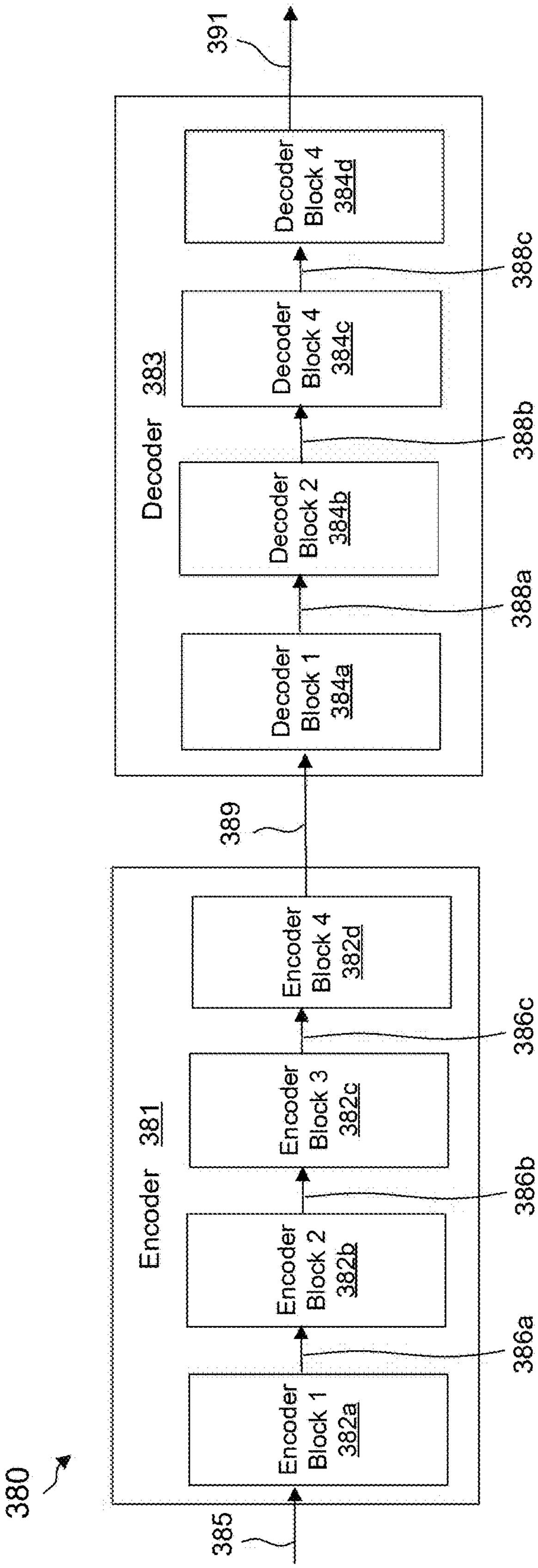

Exemplary encoder blocks and decoder blocks are illustrated in FIG. 3E. FIG. 3E illustrates an exemplary end-to-end neural audio upsampler 380. Encoder 381 of end-to-end neural audio upsampler 380 can include 4 encoder blocks 382*a*-382*d*. According to some aspects, each encoder block 382 can include 6 convolutional neural network layers with increasing dilation followed by a strided convolutional neural network layers for downsampling. In a non-limiting example for a NB input signal 385 sampled at 8 kHz, encoder block 382*a* is configured to receive input signal 385 and downsample input signal 385 by a factor of 2 to generate a first downsampled signal 386*a*. Encoder block 382*b* is configured to receive the first downsampled signal 386*a* and downsample it by a factor of 4 to generate a second downsampled signal 386*b*. Encoder block 382*c* is configured to receive the second downsampled signal 386*b* and downsample it by a factor of 4 to generate a third downsampled signal 386*c*. Encoder block 382*d* is configured to receive the third downsampled signal 386*c* and downsample it by a factor of 5 to generate a fourth downsampled signal.

According to some aspects, feature vector 389 can be the fourth downsampled signal and/or be generated based on the fourth downsampled signal.

According to some aspects, decoder 383 mirrors encoder 381's structure with strided convolutional neural network layers, replaced by transposed convolutions for upsampling. For example, decoder neural network of decoder 383 can include a cascade of smaller decoder neural networks called decoder blocks 384*a*-384*d*. In the non-limiting example of above, decoder block 384*a* can receive feature vector 389 and generate, based on feature vector 389, a first upsampled signal 388*a* that is upsampled by a factor of 10. Decoder block 384*b* can receive the first upsampled signal 388*a* and generate, based on the first upsampled signal 388*a*, a second upsampled signal 388*b* that is upsampled by a factor of 6. Decoder block 384*c* can receive the second upsampled signal 388*b* and generate, based on the second upsampled signal 388*b*, a third upsampled signal 388*c* that is upsampled by a factor of 4. Decoder block 384*d* can receive the third upsampled signal 388*c* and generate, based on the third upsampled signal 388*c*, a fourth upsampled signal that is upsampled by a factor of 2. Output signal 391 is the fourth upsampled signal and/or is generated based on the fourth upsampled signal. Output signal 391 can be a SWB signal sampled at 24 kHz.

Although four encoder blocks 382 and four decoder blocks 384 are illustrated in FIG. 3E, the aspects of this disclosure are not limited to these examples, and other number of encoder blocks and decoder blocks can be used.

According to some aspects, the neural network model(s), the ML model(s), and/or AI model(s) of encoder 301 and decoder 303 are trained together. For example, a database of SWB signals is used to train encoder 301 and decoder 303. NB signals and WB signals are generated from these SW signals. Encoder 301 can use the NB signals and/or WB signal to learn feature vector(s) 309. Decoder 303 can learn to map feature vector(s) 309 to the target SWB signals (e.g. output signals 311).

In a non-limiting example, a subset of the SWB signals in a training database of SWB signals are selected for training the neural network model(s), the ML model(s), and/or AI model(s) of encoder 301 and/or decoder 303. Each SWB signal of the subset of the SWB signals is converted to an NB signal. The NB signal is an input to encoder 301. Encoder 301 uses its neural network model(s), ML model(s), and/or AI model(s) to generate feature vector(s) (e.g., feature vector(s) 309) from the NB signal. The feature vector(s) are inputs to decoder 303. Decoder 303 upsamples and bandwidth extends the feature vector(s) to generate an output signal (e.g., output signal 311). According to some aspects, decoder 303 upsamples and bandwidth extends the feature vector(s) at a desired sampling rate. Decoder 303 uses its neural network model(s), ML model(s), and/or AI model(s) to generate the output signal. The generated output signal is compared with the corresponding SWB signal that was used to generate the NB signal. The results of the comparison can be used to update one or more parameters of the neural network model(s), the ML model(s), and/or the AI model(s) of encoder 301 and/or decoder 303. This training process can be repeated for each SWB signal of the training database of SWB signals.

Although the above example are discussed with respect to NB signals generated from the SWB signals of the training database, WB signals and/or SWB signals from the training database can be used to train encoder 301 and/or decoder 303.

According to some aspects, encoder 301 and decoder 303 for extending bandwidth of NB signal to WB signal can be trained using corresponding data (e.g., NB signals and WB signals). According to some aspects, encoder 301 and decoder 303 for extending bandwidth of NB signal to SWB signal can be trained using corresponding data (e.g., NB signals and SWB signals). According to some aspects, encoder 301 and decoder 303 for extending bandwidth of WB signal to SWB signal can be trained using corresponding data (e.g., WB signals and SWB signals). Additionally, or alternatively, the training of encoder 301 and decoder 303 for different signals can be combined.

The data used to train encoder 301 and decoder 303 can include audio signals from a wide number of speakers, languages, accents, hours of speech, music data, audio book data, and the like.

FIG. 3B illustrates another exemplary end-to-end neural audio upsampler 320. End-to-end neural audio upsampler 320 includes encoders 321*a* and 321*b* and a decoder 323. Encoders 321*a* and 321*b* can be similar to encoder 301 and decoder 323 can be similar to decoder 303. As discussed above, end-to-end neural audio upsampler 320 can be part of a receiver device, such as receiver device 104 of FIG. 1. According to some aspects, encoder 321*a* receives input signal 325*a*. Input signal 325*a* can be an audio signal transmitted from a transmitter device, such as transmitter device 102 of FIG. 1. In some examples, input signal 325*a* can be an analog signal. In some examples, input signal 325*a* can be a digital signal. In some examples, input signal 325*a* is an NB signal. In some examples, input signal 325*a* is a WB signal. In some examples, input signal 325*a* is an SWB signal.

Similar to FIG. 3A, encoder 321*a* can generate feature vector 329*a* based on input signal 325*a*. Decoder 323 can generate output signal 331 based on feature vector 329*a*. According to some aspects, decoder 323 upsamples and bandwidth extends feature vector 329*a* at a desired sampling rate (e.g., a desired resolution—e.g., 24 kHz). For example, decoder 323 receives feature vector 329*a* and adds the frequencies that are missing from the desired resolution to generate output signal 331 at the desired sampling rate (e.g., a desired resolution—e.g., 24 kHz).

Additionally, or alternatively, encoder 321*b* receives input signal 325*b*. Input signal 325*b* can be an audio signal transmitted from a transmitter device, such as transmitter device 102 of FIG. 1. In some examples, input signal 325*b* can be an analog signal. In some examples, input signal 325*b* can be a digital signal. In some examples, input signal 325*b* is an NB signal. In some examples, input signal 325*b* is a WB signal. In some examples, input signal 325*b* is an SWB signal. Similar to FIG. 3A, encoder 321*b* can generate feature vector 329*b* based on input signal 325*b*. Decoder 323 can generate output signal 331 based on feature vector 329*b*. According to some aspects, decoder 323 upsamples and bandwidth extends feature vector 329*b* at a desired sampling rate (e.g., a desired resolution—e.g., 24 kHz). For example, decoder 323 receives feature vector 329*b* and adds the frequencies that are missing from the desired resolution to generate output signal 331 at the desired sampling rate (e.g., a desired resolution—e.g., 24 kHz).

According to some aspects, one or more encoders (305 or 325) can be used for one or more sampling rates. But the encoders will share the same decoder. For example, a first encoder (e.g., encoder 321*a*) can be used for 8 kHz sampling rate, a second encoder (e.g., encoder 321*b*) can be used for 16 kHz sampling rate, a third encoder (not shown) can be used for 20 kHz sampling rate, and/or a fourth encoder (not shown) can be used for 24 kHz sampling rate. The encoders will share the same decoder (e.g., decoder 323) that uses the feature vectors to generate the SWB signal (e.g., output signal 331). Although two encoders are shown in FIG. 3B, any number of encoders can be used with a single decoder 323.

FIG. 3C illustrates another exemplary end-to-end neural audio upsampler 340. End-to-end neural audio upsampler 340 includes encoder 342, quantizer 341 and a decoder 343. Encoder 342 and quantizer 341 can operate similar to encoder 301, and decoder 343 can be similar to decoder 303. As discussed above, end-to-end neural audio upsampler 340 can be part of a receiver device, such as receiver device 104 of FIG. 1.

FIG. 3C also illustrates encoder 342 and quantizer 341. According to some aspects, encoder 342 and quantizer 341 can be part of a transmitter device 347 (e.g., transmitter device 102 of FIG. 1). In this exemplary architecture, encoder 342 receives an input signal 344 and generates encoded signal 345 that will be quantized with quantizer 341 and input to decoder 343 of the receiver device. In some examples, input signal 344 can be an analog signal. In some examples, input signal 344 can be a digital signal.

According to some aspects, encoded and quantized signal 349 (e.g., quantized feature vector 349) can be transmitted from the transmitter device 347 (e.g., transmitter device 102 of FIG. 1). In some examples, input signal 344 can be an analog signal. In some examples, input signal 344 can be a digital signal. In some examples, input signal 344 is an NB signal. In some examples, input signal 344 is a WB signal. In some examples, input signal 344 is an SWB signal.

Similar to FIG. 3A, decoder 343 can generate output signal 351 based on received quantized feature vector 349. According to some aspects, decoder 343 upsamples and bandwidth extends feature vector 349 at a desired sampling rate (e.g., a desired resolution—e.g., 24 kHz). For example, decoder 343 receives feature vector 349 and adds the frequencies that are missing from the desired resolution to generate output signal 351 at the desired sampling rate (e.g., a desired resolution—e.g., 24 kHz).

FIG. 3D illustrates another exemplary end-to-end neural audio upsampler 360. End-to-end neural audio upsampler 360 includes encoder 361, quantizer 362, and a decoder 363. According to some aspects, encoder 361 and quantizer 362 can operate similar to encoder 301, and decoder 363 can be similar to decoder 303. End-to-end neural audio upsampler 360 can be distributed over two receiver devices. For example, encoder 361 and quantizer 362 can be part of a first receiver device 373 (e.g., receiver device 104 of FIG. 1). Decoder 363 can be part of a second receiver device 375. In a non-limiting example, first receiver device 373 can be a mobile phone, and second receiver device 375 can be a smart watch. However, aspects of this disclosure are not limited to this example, and first and second receiver devices 373 and 375 can be other types of devices.

According to some aspects, encoder 361 receives an input signal 365. Input signal 365 can be an audio signal transmitted from a transmitter device, such as transmitter device 102 of FIG. 1. In some examples, input signal 365 can be an analog signal. In some examples, input signal 365 can be a digital signal. In some examples, input signal 365 is an NB signal. In some examples, input signal 365 is a WB signal. In some examples, input signal 365 is an SWB signal.

According to some aspects, encoder 361 receives input signal 365 and samples input signal 365 at a first sampling rate (e.g., a first resolution). Encoder 361 samples input signal 365 to generate a sampled signal. In some examples, the first sampling rate is the same as the sampling rate of input signal 365. In some examples, the first sampling rate is different from the sampling rate of input signal 365. In some examples, the first sampling rate is based on the bandwidth of input signal 365. Encoder 361 is further configured to encode the sampled signal into a feature vector 369. According to some aspects, feature vector 369 is a feature representation of the sampled signal. According to some aspects, feature vector 369 can include a number of signal dimensional vectors/elements. In a non-limiting example, feature vector 369 can include 128 signal dimensional vectors/elements. But aspects of this disclosure are not limited to this example Quantizer 362 can be configured to sample and quantize feature vector 369. Quantizer 362 can generate quantized feature vector 370 based on feature vector 369. For example, quantizer 362 can generate quantized feature vector 370 by quantizing feature vector 369 to generate a lower bit rate version of feature vector 369 for transmitting to second receiver device 375. In other words, instead of decoding to generate a bandwidth extended signal in first receiver device 373, quantized feature vector 370 is transmitted to second receiver device 375. Second receiver device is configured to generate the bandwidth extended signal.

Decoder 363 is configured to receive quantized feature vector 370 and can generate output signal 371 based on quantized feature vector 370. According to some aspects, decoder 363 upsamples and bandwidth extends quantized feature vector 370 at a desired sampling rate (e.g., a desired resolution—e.g., 24 kHz). For example, decoder 363 receives quantized feature vector 370 and adds the frequencies that are missing from the desired resolution to generate output signal 371 at the desired sampling rate (e.g., a desired resolution—e.g., 24 kHz). According to some aspects, before upsampling and bandwidth extending quantized feature vector 370, decoder 363 is configured to inverse quantize quantized feature vector 370. For example, decoder 363 (and/or receiver device 375) can include an inverse quantizer configured to perform an inverse quantization on quantized feature vector 370 before decoder 363 upsamples and bandwidth extends the inverse quantized feature vector. According to some aspects, using decoder 363 in second receiver device 375 (instead of first receiver device 373) can reduce delay and complexity. Rather than first performing the bandwidth extension (to, e.g., SWB) and then re-encoding this SWB signal with a coder in first receiver device 373 and then transmitting the signal to second receiver device 375, the bandwidth extension is performed in a combined fashion, reducing delay and complexity.

According to some aspects, encoders 301, 321, 342, and/or 361 can have structure similar to encoder 381 of FIG. 3E. Additionally, or alternatively, decoders 303, 323, 343, and/or 363 can have structure similar to decoder 383 of FIG. 3E.

According to some aspects, encoders 301, 321, 342, 361, and/or 381 can include encoding circuitry. For example, one or more of encoders 301, 321, 342, 361, or 381 can include hardware circuitry (e.g., dedicated hardware circuitry) configured to perform the encoding operations for the bandwidth extension operations discussed herein. Additionally, or alternatively, one or more of encoders 301, 321, 342, 361, or 381 can include or can be a processing circuitry dedicated to neural network processing configured to perform the encoding operations for the bandwidth extension operations discussed herein.

Additionally, or alternatively, decoders 303, 323, 343, 363, and/or 383 can include decoding circuitry. For example, one or more of decoders 303, 323, 343, 363, or 383 can include hardware circuitry (e.g., dedicated hardware circuitry) configured to perform the decoding operations for the bandwidth extension operations discussed herein. Additionally, or alternatively, one or more of decoders 303, 323, 343, 363, or 383 can include or can be a processing circuitry dedicated to neural network processing configured to perform the decoding operations for the bandwidth extension operations discussed herein.

Figure 4:
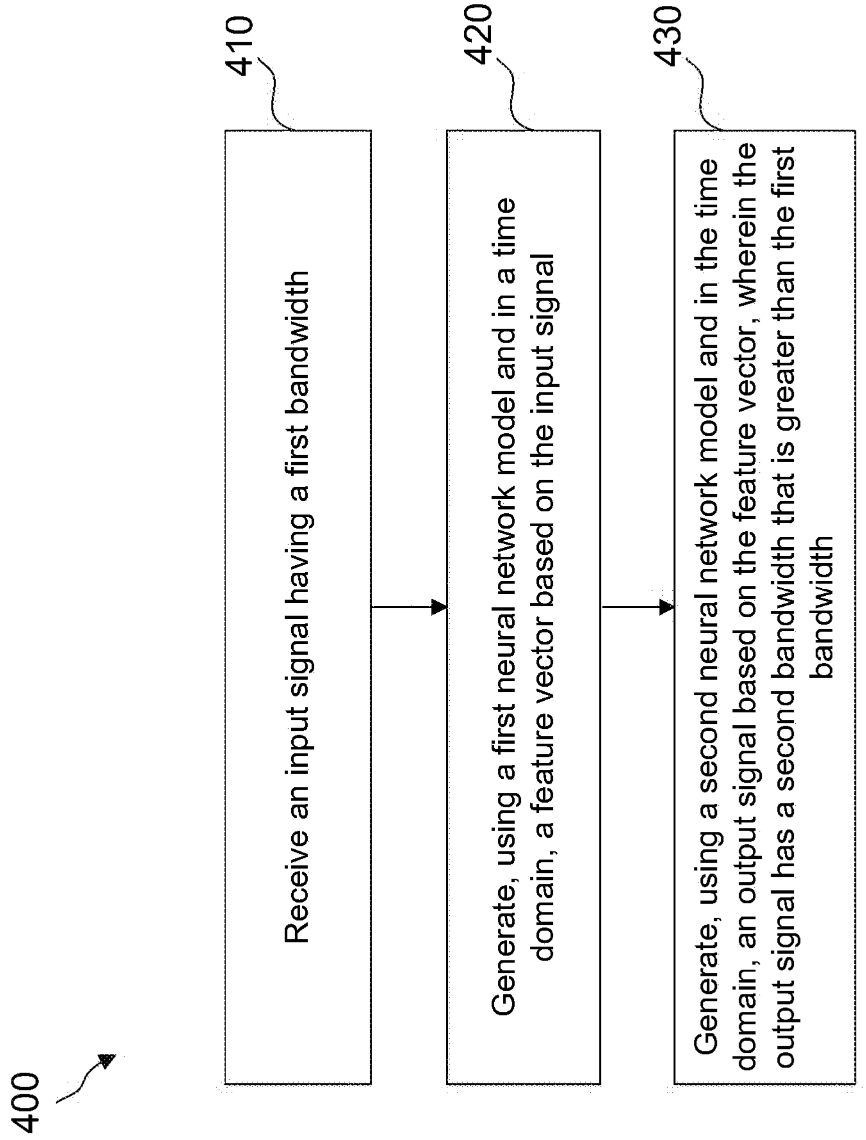
FIG. 4 illustrates a method for end-to-end neural audio upsampling and bandwidth extension, according to some aspects.

FIG. 4 illustrates a method 400 for end-to-end neural audio upsampling and bandwidth extension, according to some aspects. For illustrative purposes, the operations illustrated in method 400 will be described with reference to the example end-to-end neural audio upsampler (also referred to herein as bandwidth extender) 108, 300, 320, and/or 340 in FIGS. 1-3. Method 400 may also be performed by system 200 of FIG. 2 and/or computer system 600 of FIG. 6. Additional operations may be performed between various operations of method 400 and may be omitted merely for clarity and ease of description. Additional operations can be provided before, during, and/or after method 400; one or more of these additional operations are briefly described herein. Moreover, not all operations may be needed to perform the disclosure provided herein. Additionally, some of the operations may be performed simultaneously or in a different order than shown in FIG. 4. In some aspects, one or more other operations may be performed in addition to or in place of the presently-described operations.

At 410, an input signal is received. For example, an encoder (e.g., encoder 301, 321, or quantizer 341) of an end-to-end neural audio upsampler and bandwidth extender (e.g., 108, 300, 320, or 340) receives the input signal. The input signal can be an audio signal transmitted by a transmitter device (e.g., transmitter device 102 of FIG. 1). The input signal has a first bandwidth and a first sampling rate. For example, the input signal can be an NB signal with a bandwidth of 4 kHz or less and a sampling rate of 8 kHz. The input signal can be a WB signal with a bandwidth of 8 kHz or less and a sampling rate of 16 kHz. The input signal can be a SWB signal with a bandwidth of at least 12 kHz and a sampling rate of 24 kHz or higher.

At 420, one or more feature vectors are generated from the input signal. For example, the encoder generates the one or more feature vectors based on the input signal. According to some aspects, the encoder generates the one or more feature vectors using a first neural network model and in the time domain. According to some aspects, the encoder generates a single feature vector using the first neural network model and in the time domain. The input signal is passed through the encoder neural network (e.g., the first neural network model of the encoder). In a non-limiting example, an input signal of 480 samples corresponding to a 20 ms segment (for a signal sampled at 24 KHz) is passed through the encoder neural network (e.g., the first neural network model of the encoder). The encoder neural network can be a cascade of several smaller neural networks referred to as encoder blocks. At the output of each block, the signal is downsampled. In an exemplary implementation, four encoder blocks with downsampling factors 2, 4, 6, and 10 respectively can be used. However, the aspects of this disclosure can include other number of encoder blocks and other downsampling factors. After the original signal, which has 480 samples (as one example), is processed by all four encoder blocks, a feature vector is generated because of the downsampling factors chosen. This design of encoder and downsampling factors enable a temporally efficient representation of speech signal. In the case of multi-rate encoders, the downsampling factors can be varied such that one feature vector is generated for every 20 ms according to the sampling frequency of the input signal. According to some aspects, the first neural network model is a convolutional neural network model. The first neural network model can include four strided convolutional neural network layers for downsampling, followed by six convolutional neural network layers with increasing dilation.

According to some aspects, operation 420 can further include sampling the input signal at a sampling rate before generating the one or more feature vectors. For example, the encoder is configured to sample the input signal at the sampling rate to generate a sampled signal before generating the one or more vectors from the sample signal. In some aspects, the sampling rate can be the same as the first sampling rate of the input signal. In some aspects, the sampling rate can be the different than the first sampling rate of the input signal. In some aspects, the sampling rate can be based on the first bandwidth of the input signal.

At 430, an output signal is generated based on the one or more feature vectors. For example, a decoder (e.g., decoder 303, 323, or 343) of end-to-end neural audio upsampler and bandwidth extender (e.g., 108, 300, 320, or 340) is configured to generate the output signal from the one or more feature vectors using, for example, a second neural network model and in the time domain. On the decoder side, similar to the encoder, a cascade of smaller decoder neural networks called decoder blocks are used. Each decoder block is followed by an upsampling operation. According to some aspects, the same factors used in the encoder are used in the decoder, but in reverse order. For example, the decoder is configured to first upsample by a factor 10, followed by 6, 4, and 2. Thus, a feature vector (e.g., a single feature vector) when passed through decoder block produces a signal of, for example, 480 samples in the time-domain According to some aspects, the output signal has a second bandwidth that is greater than the first bandwidth of the input signal. For example, the output signal can be a SWB signal with a bandwidth of at least 12 kHz and a sampling rate of 24 kHz or higher. In another example, the output signal can be a SWB signal (or a Full Band signal) with a bandwidth of at least 20 kHz and a sampling rate of 48 kHz or higher.

According to some aspects, generating the output signal can include adding frequencies above the first bandwidth to the input signal to generate the output signal with the second bandwidth that is greater than the first bandwidth. According to some aspects, the second neural network model is a convolutional neural network model. The second neural network model can include four strided convolutional neural network layers for upsampling, followed by six convolutional neural network layers with increasing dilation.

According to some aspects, the output signal can be sent to, for example, a speaker to be played for a user. Additionally, or alternatively, the output signal can be processed more before being played and/or stored. However, the aspects of this disclosure are not limited to these examples.

According to some aspects, method 400 can further include receiving, at a second encoder, a second input signal having a third bandwidth different than the first and second bandwidth and generating, using a third neural network model of the second encoder and in the time domain, a second one or more feature vectors based on the second input signal. Method 400 can further include generating, using the second neural network model of the decoder and in the time domain, a second output signal based on the second one or more feature vector. The second output signal has the second bandwidth that is greater than the first and third bandwidths.

Additionally, or alternatively, method 400 can further include training the encoder and the decoder. For example, method 400 can further include training the first neural network model of the encoder, training the second neural network model of the decoder, and/or training the third neural network model of the second encoder using a database of data such as, but not limited to, speech data, audio data, music data, and the like.

Figure 5:
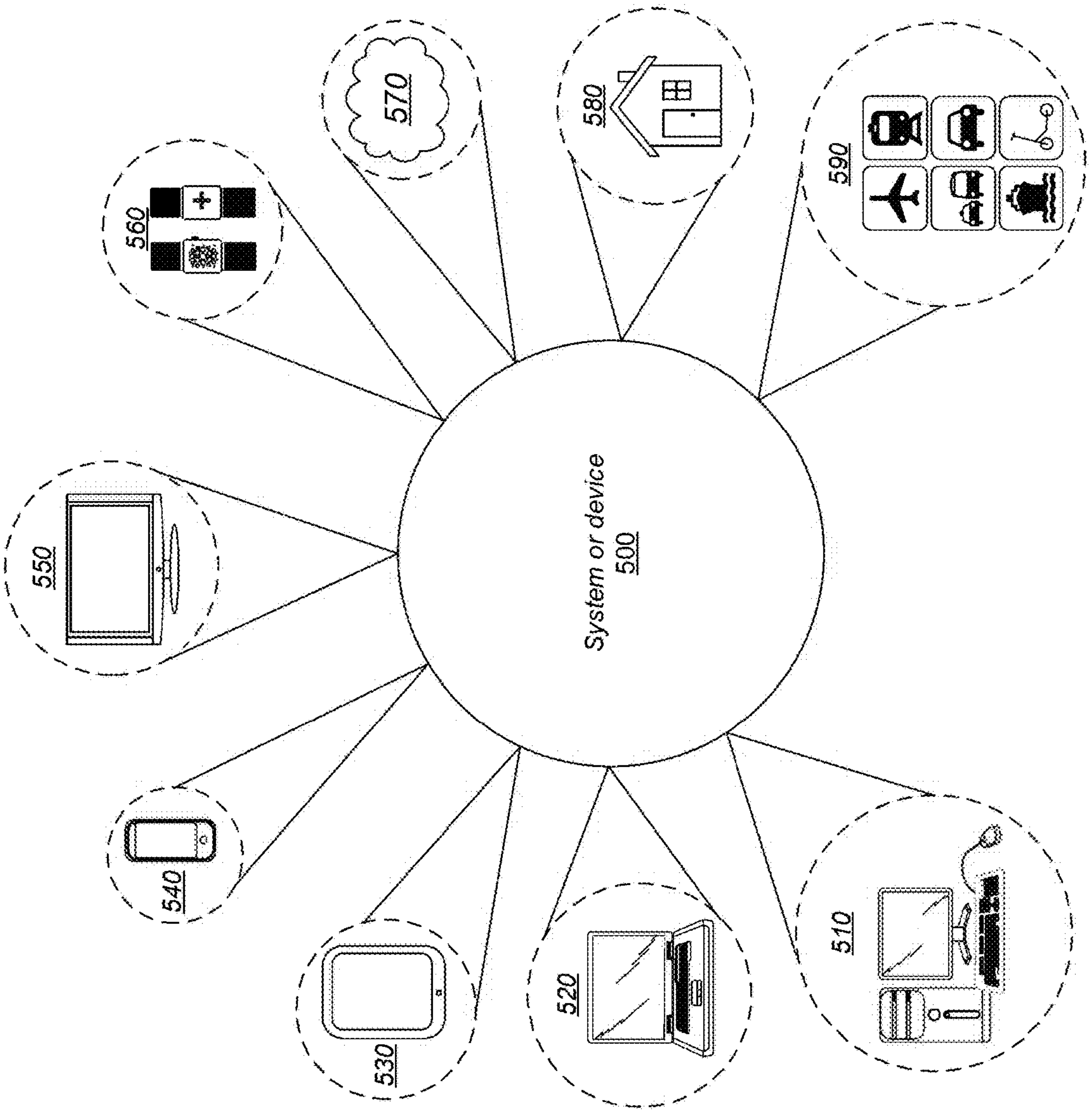
FIG. 5 illustrates various exemplary systems or devices that include aspects of the disclosed end-to-end neural audio upsampler and bandwidth extender.

FIG. 5 illustrates exemplary systems of devices that include aspects of the end-to-end neural audio upsampler and bandwidth extender as described herein. System or device 500, which can incorporate or otherwise utilize one or more of the techniques described herein, can be utilized in a wide range of areas. For example, system or device 500 can be utilized as part of the hardware of systems such as a desktop computer 510, a laptop computer 520, a tablet computer 530, a cellular or mobile phone 540, or a television 550 (or a set-top box coupled to a television).

Similarly, the disclosed aspects can be utilized in a wearable device 560, such as a smartwatch or a health-monitoring device. Smartwatches can implement a variety of different functions—for example, access to email, cellular service, calendar, health monitoring, etc. A wearable device can also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 500 can also be used in various other contexts. For example, system or device 500 can be utilized in the context of a server computer system, such as a dedicated server or on shared hardware that implements a cloud-based service 570. Still further, system or device 500 can be implemented in a wide range of specialized devices, such as home electronic devices 580 that includes refrigerators, thermostats, security cameras, etc. The interconnection of such devices is often referred to as the "Internet of Things" (IoT). Elements can also be implemented in various modes of transportation. For example, system or device 500 can be employed in the control systems, guidance systems, entertainment systems, etc. of various types of vehicles 590.

The applications illustrated in FIG. 5 are merely exemplary and are not intended to limit the potential future applications of disclosed systems or devices. Other example applications include, without limitation, portable gaming devices, music players, data storage devices, unmanned aerial vehicles, etc.

Figure 6:
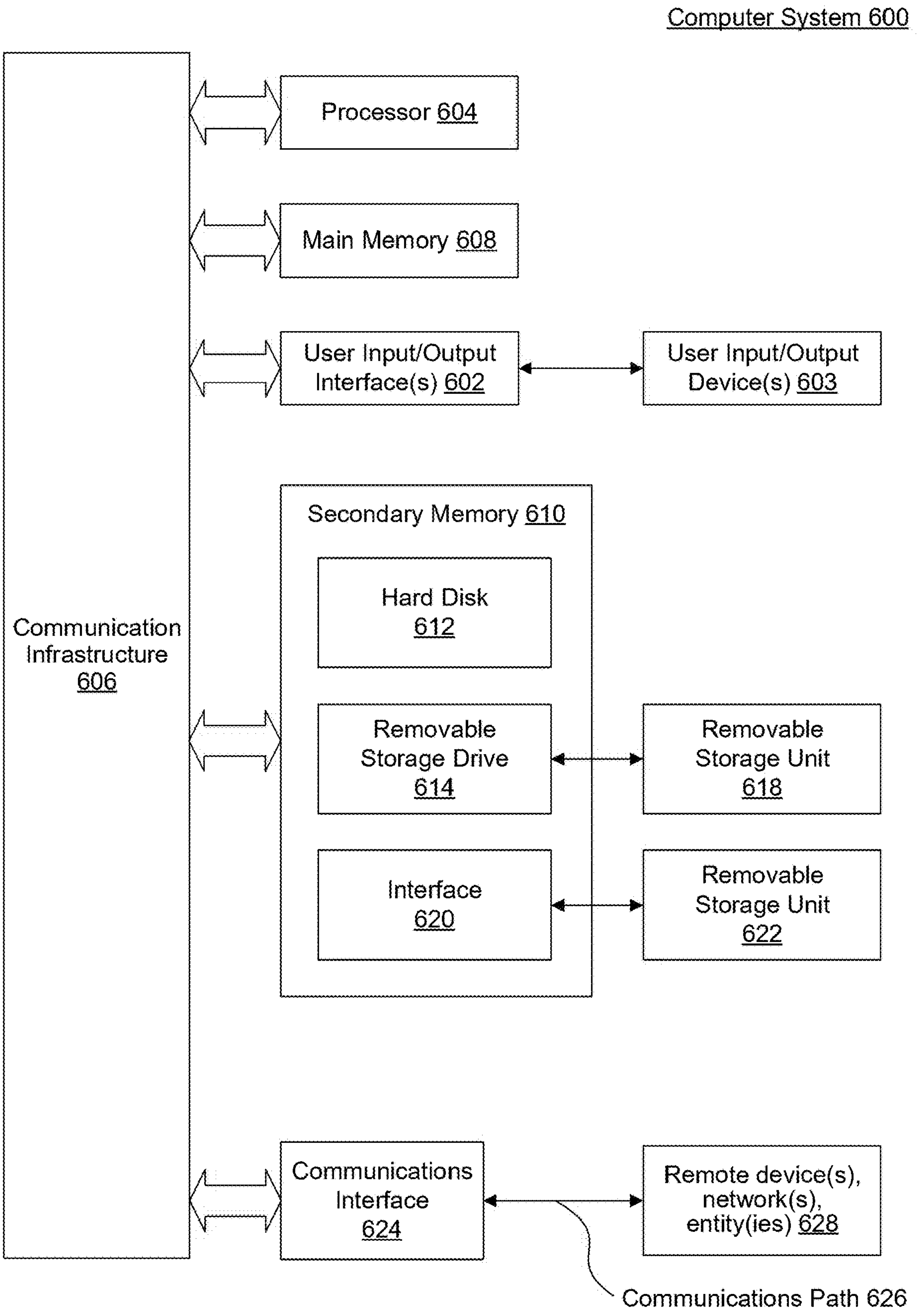
FIG. 6 is an example computer system that can be used for implementing some aspects or portion(s) thereof.

Various aspects can be implemented, for example, using one or more computer systems, such as computer system 600 shown in FIG. 6. Computer system 600 can be any computer capable of performing the functions described herein such as devices 102, 104 of FIG. 1, and/or 200 of FIG. 2. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Abstract of the Disclosure section, is intended to be used to interpret the claims. The Abstract of the Disclosure section may set forth one or more but not all possible aspects of the present disclosure as contemplated by the inventor(s), and thus, are not intended to limit the subjoined claims in any way.

Unless stated otherwise, the specific aspects are not intended to limit the scope of claims that are drafted based on this disclosure to the disclosed forms, even where only a single example is described with respect to a particular feature. The disclosed aspects are thus intended to be illustrative rather than restrictive, absent any statements to the contrary. The application is intended to cover such alternatives, modifications, and equivalents that would be apparent to a person skilled in the art having the benefit of this disclosure.

The foregoing disclosure outlines features of several aspects so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the aspects introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. An electronic device, comprising:
- a memory; and
- at least one processor coupled to the memory and configured to:
  - receive an input signal having a first bandwidth;
  - generate, using a first neural network model and in a time domain, a feature vector based on the input signal;
  - generate, using a second neural network model and in the time domain, an output signal based on the feature vector, wherein the output signal has a second bandwidth that is greater than the first bandwidth,
  - generate, using a third neural network model and in the time domain, a second feature vector based on a second input signal, wherein the second input signal has a third bandwidth; and
  - generate, using the second neural network model and in the time domain, a second output signal based on the second feature vector, wherein the second output signal has the second bandwidth that is greater than the first and third bandwidths.

2. The electronic device of claim 1, wherein the at least one processor is further configured to sample the input signal at a first sampling rate before generating the feature vector.

3. The electronic device of claim 1, wherein the at least one processor is further configured to:
- receive the second input signal having the third bandwidth different than the first and second bandwidths.

4. The electronic device of claim 1, wherein the at least one processor is further configured to train the first neural network model and the second neural network model using a database of speech data and music data.

5. The electronic device of claim 1, wherein the first neural network model and the second neural network model are convolutional neural network models.

6. The electronic device of claim 1, wherein the first neural network model comprises four strided convolutional neural network layers for downsampling and six convolutional neural network layers with increasing dilation.

7. The electronic device of claim 1, wherein the second neural network model comprises four strided convolutional neural network layers for upsampling and six convolutional neural network layers with increasing dilation.

8. The electronic device of claim 1, wherein to generate the output signal, the at least one processor is configured to add frequencies above the first bandwidth to the input signal to generate the output signal with the second bandwidth that is greater than the first bandwidth.

9. A method, comprising:

receiving, by an encoder, an input signal having a first bandwidth;

generating, using a first neural network model of the encoder and in a time domain, a feature vector based on the input signal;

generating, using a second neural network model of a decoder and in the time domain, an output signal based on the feature vector, wherein the output signal has a second bandwidth that is greater than the first bandwidth, generating, using a third neural network model of a second encoder and in the time domain, a second feature vector based on a second input signal, wherein the second input signal has a third bandwidth; and generating, using the second neural network model of the decoder and in the time domain, a second output signal based on the second feature vector, wherein the second output signal has the second bandwidth that is greater than the first and third bandwidths.

10. The method of claim 9, further comprising sampling, using the encoder, the input signal at a first sampling rate before generating the feature vector.

11. The method of claim 9, further comprising:

receiving, at the second encoder, the second input signal having the third bandwidth different than the first and second bandwidths.

12. The method of claim 9, further comprising training the first neural network model and the second neural network model using a database of speech data and music data.

13. The method of claim 12, wherein the first neural network model and the second neural network model are convolutional neural network models.

14. The method of claim 9, wherein the first neural network model comprises four strided convolutional neural network layers for downsampling and six convolutional neural network layers with increasing dilation.

15. The method of claim 9, wherein the second neural network model comprises four strided convolutional neural network layers for upsampling and six convolutional neural network layers with increasing dilation.

16. The method of claim 9, wherein generating the output signal comprises adding frequencies above the first bandwidth to the input signal to generate the output signal with the second bandwidth that is greater than the first bandwidth.

17. The method of claim 9, wherein the encoder is part of a first electronic device, and the method further comprising:

generating, using a quantizer of the first electronic device, a quantized feature vector based on the feature vector; and transmitting the quantized feature vector to a second electronic device, wherein the decoder is part of the second electronic device and is configured to generate the output signal based on the quantized feature vector.

18. A non-transitory computer-readable medium storing instructions that, when executed by a processor of an electronic device, cause the electronic device to perform operations comprising:

receiving, by an encoder, an input signal having a first bandwidth;

generating, using a first neural network model of the encoder and in a time domain, a feature vector based on the input signal, wherein the first neural network model comprises a plurality of encoder blocks with respective downsampling factors;

generating, using a second neural network model of a decoder and in the time domain, an output signal based on the feature vector, wherein the output signal has a second bandwidth that is greater than the first bandwidth, and wherein the second neural network model comprises a plurality of decoder blocks with respective upsampling factors;

generating, using a third neural network model of a second encoder and in the time domain, a second feature vector based on a second input signal, wherein the second input signal has a third bandwidth; and generating, using the second neural network model of the decoder and in the time domain, a second output signal based on the second feature vector, wherein the second output signal has the second bandwidth that is greater than the first and third bandwidths.

19. The non-transitory computer-readable medium of claim 18, the operations further comprising:

receiving, at the second encoder, the second input signal having the third bandwidth different than the first and second bandwidths, wherein the third neural network model comprises a second plurality of encoder blocks with respective downsampling factors.

20. The non-transitory computer-readable medium of claim 18, wherein:

generating the output signal comprises adding frequencies above the first bandwidth to the input signal to generate the output signal with the second bandwidth that is greater than the first bandwidth, the first neural network model comprises four strided convolutional neural network layers for downsampling and six convolutional neural network layers with increasing dilation, and the second neural network model comprises the four strided convolutional neural network layers for upsampling and the six convolutional neural network layers with increasing dilation.

* * * * *